Nov. 18, 1941.　　A. J. FAUSEK ET AL　　2,262,929

VALVE

Filed Jan. 8, 1940

INVENTOR.
ARTHUR J. FAUSEK
IRWING F. FAUSEK
BY
ATTORNEY.

Patented Nov. 18, 1941

2,262,929

UNITED STATES PATENT OFFICE 2,262,929

VALVE

Arthur J. Fausek and Irwing F. Fausek, Clayton, Mo.

Application January 8, 1940, Serial No. 312,798

2 Claims. (Cl. 284—14)

This invention relates generally to valves and more specifically to valves of the type known as lager valves and adapted for use in association with beer containers for sealing the containers until they are tapped and for excluding dirt and other foreign matter from the beer containers after the contents have been withdrawn therefrom, the predominant object of the invention being to provide a valve of this type which may be formed from sheet metal instead of from castings as was usually the case heretofore.

For many years prior to this invention lager valves have been used which were produced largely from castings, and when lager valves of this construction were employed with wooden beer containers, such as the old style barrels and kegs, they functioned in a highly efficient manner. However, of late years, great numbers of beer containers have been used which are formed of metal, stainless steel, for instance, and it has been found that when lager valves made up of castings which were not formed from stainless steel were used with stainless steel containers, or containers lined with stainless steel, a galvanic action was usually set up which was highly undesirable in that it affected the beer contained in the containers. Also it has been found that when the lager valves were nickelplated the plating was frequently removed from the valve parts by the galvanic action mentioned. To eliminate the production of the troublesome galvanic action mentioned above, attempts were made to produce lager valves from castings made of stainless steel but because of the hardness of this material and for other reasons, the machining operations required to prepare the castings for use as parts of the valves were rendered so expensive as to preclude economical production of the valves.

The main purpose of the present invention, therefore, is to provide a lager valve which may be produced largely from sheet metal instead of castings as heretofore. By so producing lager valves they may be made of stainless steel, or other desired metal, and no expensive machining operations of the valve parts are required. Also because the lager valves are made from the same material from which the associated containers, or the linings thereof, are made no galvanic action will be set up between the containers, or their linings, and the lager valves when said assembled containers and lager valves are in use.

Figures 1, 2, 3, 4, 5:
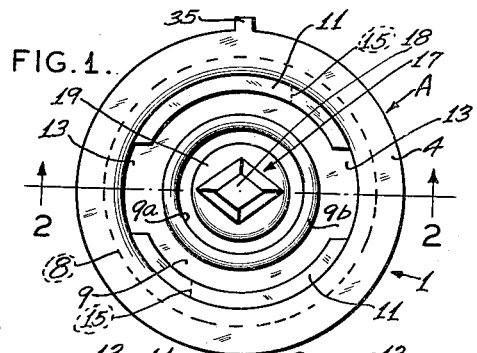
Fig. 1 is a plan view of the improved valve.
Fig. 2 is a vertical section taken on line 2—2 of Fig. 1.
Fig. 3 is a vertical section taken on line 3—3 of Fig. 2.
Fig. 4 is a view partly in horizontal section and partly in plan taken on line 4—4 of Fig. 3.
Fig. 5 is a vertical section of a modified form of the body of the improved valve.

In the drawing, wherein are shown for the purpose of illustration, merely, two embodiments of the invention, A designates generally in Figs. 1, 2, 3, and 4, one form of lager valve of the present invention. The lager valve A includes a valve body 1 which is preferably formed of sheet metal, said valve body being of hollow, cylindrical form and being provided with a bottom wall 2 through which a centrally located opening 3 is formed which is defined by an upstanding, annular flange 3'. At the top of the valve body a horizontal, annular flange 4 is provided which is an outwardly projected extension of the circumferential wall of the valve body. Formed through the bottom wall 2 of the valve body is a pair of oppositely disposed, arcuate valve apertures 5 which serve as passageways through which beer passes when the valve, in use, is in an open condition.

The body 1 of the improved valve A, as illustrated in Figs. 1, 2, 3, and 4, is comprised of a plurality of body parts which are assembled and secured together to provide a unitary valve body; that is to say said valve body includes an upper body section 6, a lower body section 7, and the bottom wall 2 previously referred to herein. The upper body section 6 comprises a circumferential wall 8 which is provided with the previously mentioned outwardly extended annular flange 4 at its upper end, and a bottom wall 9 substantially centrally of which an opening 9a is formed therethrough, said opening being surrounded by an upstanding, annular extension 9b which is formed on the wall 9 and serves as a valve seat. The lower body section 7 comprises a circumferential wall 10 which is of substantially the same diameter as the circumferential wall 8 of the upper body section 6, said lower body section being in the form of a simple cylinder. The bottom wall 2, whose construction with respect to the central opening 3 and the valve apertures 5 thereof has already been described, is provided also with an upstanding, annular, marginal flange 2'. With regard to the bottom wall 2 it is to be noted that said bottom wall is formed from heavier or thicker material. This is important where it is desired to form the upper and lower body sections of relatively thin or light gauge material and where a bottom wall formed of heavier gauge material is desired.

The upper body section 6, the lower body section 7, and the bottom wall 2 are assembled as shown to the best advantage in Figs. 2 and 3 with top and bottom edges of the lower body section 7 in contact with the bottom face of the wall 9 of the upper body section and with the top face of the flange 2' of the bottom wall 2, respectively. The body parts referred to are secured together in their assembled condition by welding, soldering, or otherwise, to provide a rigid, unitary, fluid-tight valve body.

Disposed in the upper portion of the valve body 1 is a pair of opposed elements 11 of arcuate formation, the outer faces of said elements being in contact with the inner face of the circumferential wall of the valve body. The elements 11 are secured in place within the valve body in any suitable manner, such for instance, as by welding, soldering, or otherwise, said elements being so disposed with respect to each other that passageways 13 are provided at opposite sides of the valve body, and within same, between corresponding ends of said elements. Each of the elements 11 is provided with a lower, inclined face which provides a cam face 14, said cam face extending from one end of the element to a vertical face 15 which is a part of a downwardly projected extension 16 formed on said element.

Associated with the body 1 of the valve A is a valve stem 17 which, at its upper end, is provided with a noncircular head portion 18, said noncircular head portion at its lower end being provided with a flange 19 which contacts with one of a plurality of washers 20 interposed between said flange 19 and the top edge of the annular flange 3' which defines the opening 3 of the bottom wall 2 of the valve body 1. The portion 21 of the valve stem located immediately below the flange 19 of the head portion 18 of said valve stem, is circular in cross-section and is disposed in the opening 3 of the valve body with its circumferential face contacting with the inner face of the upstanding annular flange 3'. The portion 22 of the valve stem 17 located immediately below the circular portion 21 is provided with opposed, flat faces, as shown in Fig. 4, which gives to this stem section an elongated, noncircular cross-sectional shape, and the portion 23 of the valve stem located below the portion 22 thereof is circular in cross-section and is externally screwthreaded throughout a portion of its length.

Mounted on the valve stem 17 is a valve head which includes an element 24 shaped as shown to the best advantage in Figs. 2, 3, and 4, said element comprising a central portion 25 from which flared portions 26 extend outwardly in opposite directions. The central portion of the element 24 is provided with a centrally located, noncircular opening, which corresponds in shape and size with the cross-section of the portion 22 of the valve stem, and said portion 22 of the valve stem extends through the noncircular opening of the element 24. The valve head includes also a member 27 which comprises a lower sleeve portion 28, a horizontal wall 29, and a marginal upstanding flange 30. The upper portion of the member 27 corresponds in shape with the element 24 and said element 24 rests on the horizontal wall 29 of said member 27 and is surrounded by the upstanding flange thereof. The valve head structure likewise includes a facing 31, formed of rubber or other suitable material, said facing being arranged as shown to the best advantage in Figs. 2 and 3. In other words the top face of the facing material is arranged in close contact with the lower face of the bottom wall 2 of the valve body 1 and a portion 31a of said facing material is disposed between the outer edge of the element 24 and the inner face of the marginal flange 30 of the member 27. Also portions 31b are extended into apertures 24' of the element 24, and a portion 31c of said facing material overlaps the top edge of the upstanding flange 25' which surrounds the opening formed centrally through the element 24.

The lower sleeve portion 28 surrounds the portion 23 of the valve stem 20 and said sleeve portion is of such diameter relative to the diameter of the stem portion 23 that an annular space is present between the inner face of the sleeve portion and the outer face of the stem portion 23. This annular space receives packing material 32 to which pressure is applied by a gland 33 which is mounted on the stem portion 23, a nut 34 being mounted on the stem portion 23 in contact with the gland 33 in order to prevent unintended rotation of said gland with respect to said stem portion 23.

In the use of the improved lager valve said valve is disposed in an opening formed in a beer container in the usual manner, a projection 35 which is extended from the valve body being extended into a cavity formed in the container so as to prevent rotation of the valve body with respect to the opening of the container. When, in the use of the improved lager valve, it is desired to tap or vent a container with which the valve is associated the appropriate fitting (not shown) is associated with the lager valve by passing a portion of said fitting downwardly into the valve, laterally extended lugs on the fitting passing downwardly through the vertical passageways 13 between corresponding ends of the elements 11, a valve portion of the fitting moving in contact with the valve seat 9b, and a noncircular socket portion of the fitting moving into embracing relation with respect to the noncircular head 18 of the valve stem 17 of the valve. The fitting is then rotated in a clockwise direction to rotate the laterally extended lugs of the fitting in contact with and with respect to the cam faces 14 on the elements 11. This rotation of the fitting will force the valve portion of the fitting into tight contact with the valve seat 9b of the valve because of movement of the laterally extended lugs of the fitting in contact with the cam faces 14 of the elements 11, and simultaneously the valve stem 17 of the valve will be rotated to move the portions of the valve head which close the valve apertures 5 of the valve, away from said apertures. When the contents of the container have been withdrawn therefrom the valve may be closed by reversing the direction of rotation of the fitting to move portions of the valve head to positions where they close the valve apertures 5 and to bring the laterally extended lugs of the fitting in line with the vertical passageways 13 of the valve body. The fitting is then moved outwardly relative to the valve body to disengage said fitting from the valve, the laterally extended lugs of the fitting passing through the passageways 13 of the valve body.

In Fig. 5 a modified form of the body of the improved valve is illustrated. In accordance with this form of valve body a body section 36 is employed which is of cylindrical formation, the circumferential wall 37 of said body section being provided at its top with an outwardly projected, annular flange 38 which is similar to the flange 4 of Figs. 1, 2, and 3. Secured to the body section 36 at the bottom thereof by welding or soldering operations, or otherwise, is a bottom wall 39 of relatively heavy construction, said bottom wall being provided with a centrally located opening 40, which is defined by an upstanding, annular flange 40′, and having formed therethrough opposed valve apertures 41. Also the bottom wall is provided with an annular, marginal flange 39′, the top face of which contacts with the bottom edge of the circumferential wall of the body section 36. Arranged in the upper portion of the body section 36 is a pair of arcuate elements 42 which are formed and arranged within said body section as has previously been described in connection with the elements 11 of Figs. 1, 2, and 3.

Disposed within the body section 36 of Fig. 5 is an insert 43 which includes an annular, marginal flange 43a, and a horizontal wall 43b, said horizontal wall 43b having a centrally located opening 44 formed therethrough which is surrounded by an annular, upstanding extension 43c which is formed on said insert and provides a valve seat similar to the valve seat 9b of Figs. 2 and 3. The annular, marginal flange of the insert 43 contacts with the inner face of the circumferential wall of the body section 36, and is suitably secured thereto by welding, soldering, or otherwise. Also the circumferential wall of the body section 36 is provided with an inwardly projected bead 45 which serves as an abutment for the insert 43.

The valve construction illustrated in Figs. 2 and 3 may, if desired, have associated therewith a ring 46 which is formed of any suitable material and is disposed about the valve body and immediately beneath the flange 4. This ring may be a solid ring or a split ring, as preferred, and it serves as a spacer to properly locate the valve in the opening in a wall of a container which is adapted to receive the valve.

We claim:

1. A lager valve comprising a hollow cylindrical body comprised of a plurality of cylindrical parts formed from relatively thin material and secured together to produce a unitary valve body the cylindrical parts of which are completely external to each other, a transversely extended wall portion formed on and within one of said cylindrical parts which provides a seat and has an opening formed therethrough, said transversely extended wall being produced by displacing a portion of the circumferential wall of the cylindrical part on which the transversely extended wall is formed to produce said transversely extended wall, one of said cylindrical parts having an edge of its cylindrical wall in contact with a portion of the other of said cylindrical parts to provide a butt joint between said cylindrical parts at which joint said cylindrical parts are secured together, an end wall at an end of the valve body, said end wall having an opening formed therethrough substantially centrally thereof and being provided with a valve aperture formed therethrough, a cam face disposed within said valve body which is adapted to be engaged by a portion of a fitting adapted for association with the larger valve so as to cam a valve portion of said fitting into cooperative relation with said seat upon rotation of said fitting relative to the valve body, a valve stem extended through the centrally located opening of said end wall and adapted for rotation relative to the valve body, and a valve head rotatable with said valve stem in contact with said end wall and with respect to the valve aperture therein.

2. A lager valve comprising a hollow cylindrical body comprised of a plurality of cylindrical parts formed from relatively thin material and secured together to produce a unitary valve body the cylindrical parts of which are completely external to each other, a transversely extended wall portion formed on and within one of said cylindrical parts at an end thereof which provides a seat and has an opening formed therethrough, said transversely extended wall being produced by displacing a portion of the circumferential wall of the cylindrical part on which the transversely extended wall is formed to produce said transversely extended wall, one of said cylindrical parts having an edge of its cylindrical wall in contact with a portion of the other of said cylindrical parts to provide a butt joint between said cylindrical parts at which joint said cylindrical parts are secured together, an end wall which is formed from material thicker than the material of said cylindrical parts that is secured to one of said cylindrical parts at an end of the valve body, said end wall having an opening formed therethrough substantially centrally thereof and being provided with a valve aperture formed therethrough, a cam face disposed within said valve body which is adapted to be engaged by a portion of a fitting adapted for association with the lager valve so as to cam a valve portion of said fitting into cooperative relation with said seat upon rotation of said fitting relative to the valve body, a valve stem extended through the centrally located opening of said end wall and adapted for rotation relative to the valve body, and a valve head rotatable with said valve stem in contact with said end wall and with respect to the valve aperture therein.

ARTHUR J. FAUSEK.
IRWING F. FAUSEK.